United States Patent [19]

Eason et al.

[11] Patent Number: 5,048,789
[45] Date of Patent: Sep. 17, 1991

[54] MICROPHONE STAND

[75] Inventors: Donald H. Eason; Jamie D. Porter, both of Fort Collins, Colo.

[73] Assignee: Ultimate Support Systems, Inc., Fort Collins, Colo.

[21] Appl. No.: 459,567

[22] Filed: Jan. 2, 1990

[51] Int. Cl.⁵ .............................................. F16B 7/00
[52] U.S. Cl. .................................. 248/544; 248/188.7; 248/412; 403/351
[58] Field of Search ............... 248/544, 125, 411, 412, 248/161, 346, 910, 188.7; 403/351, 350, 109; 108/91, 92; 211/194, 205

[56] References Cited

U.S. PATENT DOCUMENTS

| 1,893,799 | 1/1933 | Harrington | 248/188.7 |
| 1,970,624 | 8/1934 | Recker | 248/412 |
| 2,170,006 | 8/1939 | Brandt | 248/188.7 |
| 2,283,324 | 5/1942 | Faber | 248/188.7 |
| 2,459,785 | 1/1949 | Allerton | 248/412 |
| 3,724,885 | 4/1973 | Becker | 403/351 |
| 4,076,437 | 2/1978 | Mazzolla | 248/411 |
| 4,464,078 | 8/1984 | Vorobyov | 403/351 |

FOREIGN PATENT DOCUMENTS

| 1338255 | 11/1973 | United Kingdom | 403/350 |
| 1438212 | 6/1976 | United Kingdom | 403/350 |

Primary Examiner—David L. Talbott
Assistant Examiner—Robert A. Olson
Attorney, Agent, or Firm—Dean P. Edmundson

[57] ABSTRACT

A support stand is described which is stackable with other similar stands. The base in one embodiment includes at least one inwardly extending slot, and an upright member is secured to the base. In another embodiment a microphone stand is described which includes two upright members which are telescoped together. The uppermost upright member can be locked in a desired position by a rotatable collar.

17 Claims, 7 Drawing Sheets

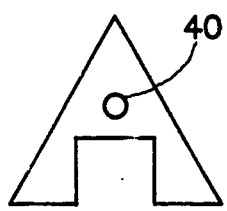
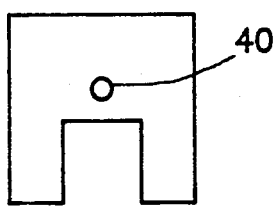
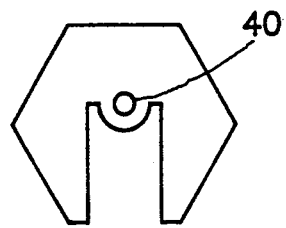
Fig. 9　　　　Fig. 10　　　　Fig. 11
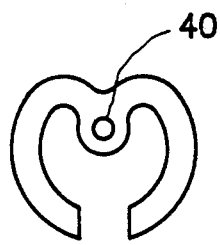
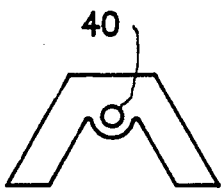
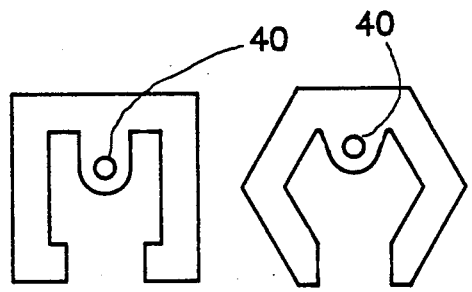
Fig. 12　　Fig. 13　　Fig. 14　　Fig. 15
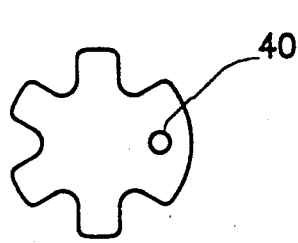
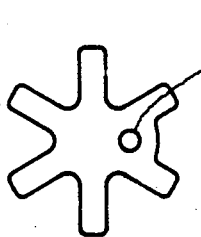
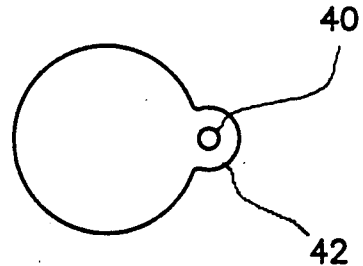
Fig. 16　　　　Fig. 17　　　　Fig. 18

5,048,789

1

MICROPHONE STAND

FIELD OF THE INVENTION

This invention relates to upright support stands. More particularly, this invention relates to support stands of the type including a base member and an upright member secured to the base member. Even more particularly, this invention relates to microphone stands or the like.

BACKGROUND OF THE INVENTION

Support stands of various types are known and have been used for a variety of purposes. In the music and entertainment fields, support stands are used for supporting items such as microphones, speakers, lights, etc.

Many of such support stands are adjustable as to height. For example, many support stands include a telescoping upright member. A lock or catch means is used to hold the uppermost portion of the upright in a desired position. Some types of locks and catches work better than others.

Another disadvantage associated with certain types of support stands concerns the type of base member used to support the upright member. For example, one common style of a base previously used is a solid, heavy metal base (usually made of cast iron). Such bases are bulky and cumbersome. Consequently, they are not easy to carry or transport. Another common style of a base which has been used is a steel tripod whose legs fold or collapse downwardly. The tripod is releasably secured to the stand (for example, with a wing nut which may be loosened, thereby allowing the folded tripod base to slide upwardly along the stand). Thus, the tripod base is a separate unit which must be securely fastened to the stand in order to support the stand in a stable manner.

Another type of telescoping microphone stand which has been available utilizes a tilting disk at the bottom of the vertically adjustable section of the stand. The tilting disk is designed to prevent the adjustable section from being pulled downwardly by gravity but it does not restrict upward movement of such section. A movable knob at the upper end of the stand is designed to tilt and release the disk to allow downward movement of the adjustable section. Thus, such stand does not involve a positive lock of the vertically adjustable section to the stationary section.

Another problem with conventional support stands (such as microphone stands) is that they cannot be easily stacked for storage or transport. Even those support stands which have folding legs are not always conveniently stored or transported. Certainly, such stands are not easily stacked.

Yet another problem with conventional microphone stands which include an extensible riser member is that a pinch point exists between the upper end of the riser and the upper end of the main upright member. Thus, care must be taken to prevent one's hand from becoming pinched when the riser member is lowered to its lowermost position.

SUMMARY OF THE PRESENT INVENTION

In accordance with the present invention there is provided, in one embodiment, an improved support stand (such as a microphone stand or the like) comprising a base member and an upright member secured to the base. The base is designed such that support stands of the same design can be stacked upon each other without disassembly.

In another embodiment the support stand includes a telescoping upright member, i.e., two upright sections which are slidably engaged. The lowermost section is secured to the base member, and the riser member is slidably received in the lowermost section and can be moved vertically. The uppermost section (a riser member) can be locked in any desired position. At the upper end of the lowermost section there is a clutch member (which may include a slot which extends longitudinally). A collar member carried by the upper end of the lowermost section can be rotated between locked and unlocked positions to thereby control locking and unlocking of the riser member in a desired position.

The support stands of the invention are especially useful as microphone stands or the like. Preferred stands include a base member which enables like stands to be stacked upon each other, and such stands also include a vertically adjustable riser member. A glide carried by the lower end of the riser member facilitates smooth and quiet movement relative to the upright member and also eliminates a pinch point between the upper ends of the riser member and the upright member.

Other advantages of the support stand of the invention will be apparent from the following detailed description and the accompanying drawings.

BRIEF DESCRIPTION OF THE DRAWINGS

The invention is described in more detail hereinafter with reference to the accompanying drawings, wherein like reference characters refer to the same parts throughout the several views and in which:

FIGS. 9-18 are top views illustrating other shapes of base members which are useful in the present invention.

DETAILED DESCRIPTION OF THE INVENTION

Figure 1:
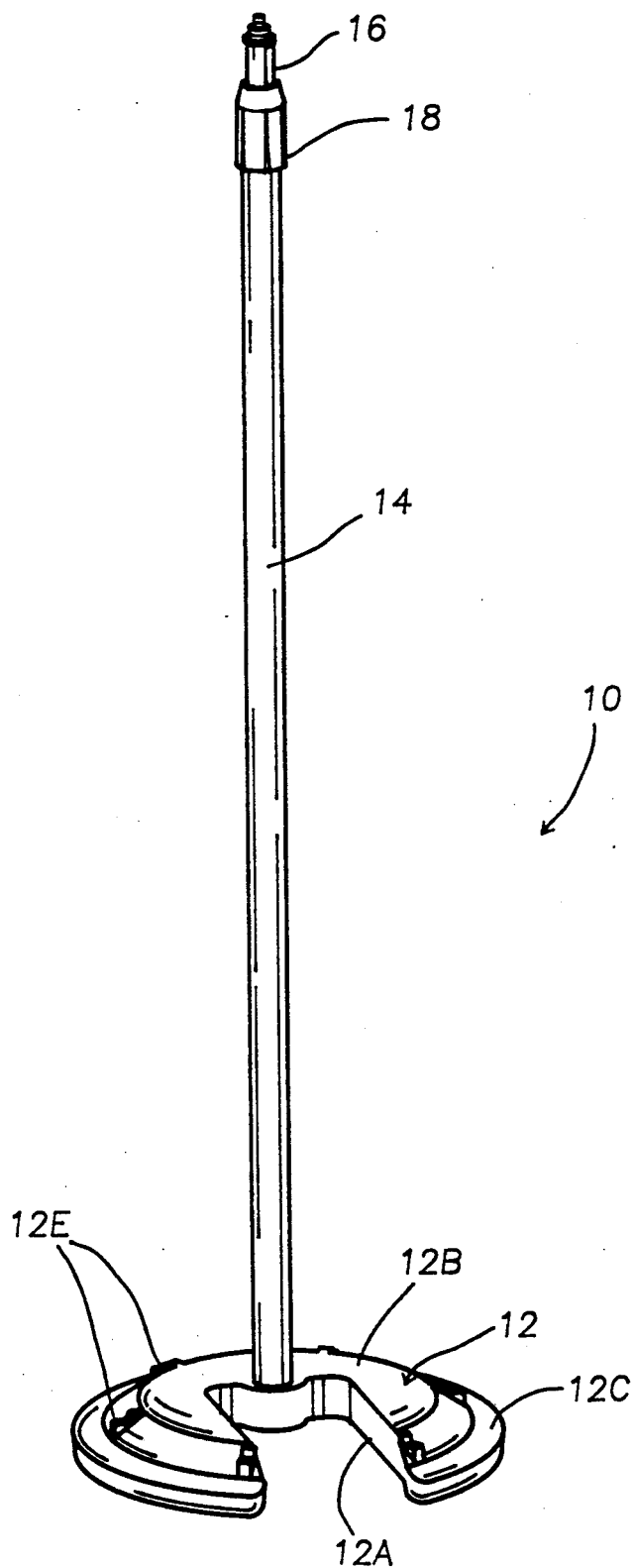
FIG. 1 is a perspective view of a preferred embodiment of the support stand of the invention.
Figure 2:
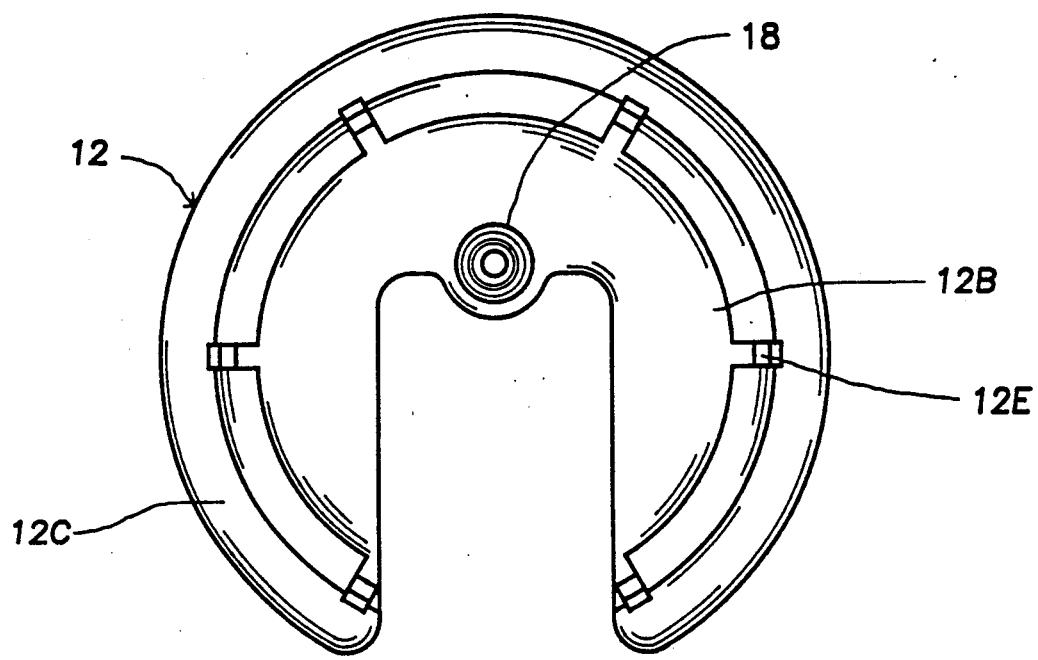
FIG. 2 is a top view of the support stand shown in FIG. 1.

In the drawings there is shown a preferred embodiment of support stand 10 of the invention comprising a base member 12 and an elongated upright member 14. Preferably the upright member is tubular and preferably is perpendicular to the base member.

In a preferred embodiment there is an elongated riser member 16 which is slidably received in the upper end of upright member 14. A rotatable collar member 18 is carried on the upper end of the upright member and is adapted to lock the riser member in any desired vertical position.

The support stand of the invention is useful for a variety of purposes. For example, it is especially useful for supporting a microphone, speaker, lights, camera equipment, telescopes, sheet music, microphone booms, tables, and the like. The preferred use is for supporting a microphone.

In the preferred embodiment illustrated in the drawings, the base member 12 is a disc which includes a radial slot 12A which extends from the edge of the base inwardly a distance at least equal to the radius of the base member. The slot 12A preferably includes parallel sides, as illustrated. The width of the slot 12A is at least about 35% of the width of the base member and may be as much as 50% thereof, for example.

Figure 3:
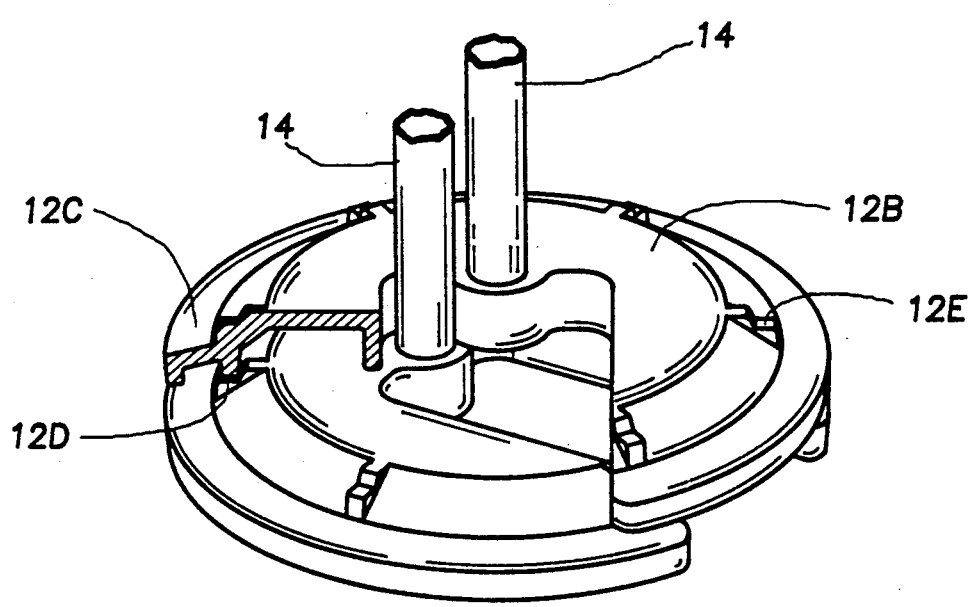
FIG. 3 is a partially cut-away, cross-sectional view illustrating the stackable feature of the invention.

The purpose of the slot 12A in the base member is to enable the support stands to be stacked upon each other. The slot 12A enables the upright member of a lower support stand to extend through the base member of an upper support stand. In this manner several similar support stands can be stacked on top of each other such that the base of the upper stand is directly over the base of the lower stand. FIG. 3 illustrates two support stands in stacked arrangement.

Figure 3A:
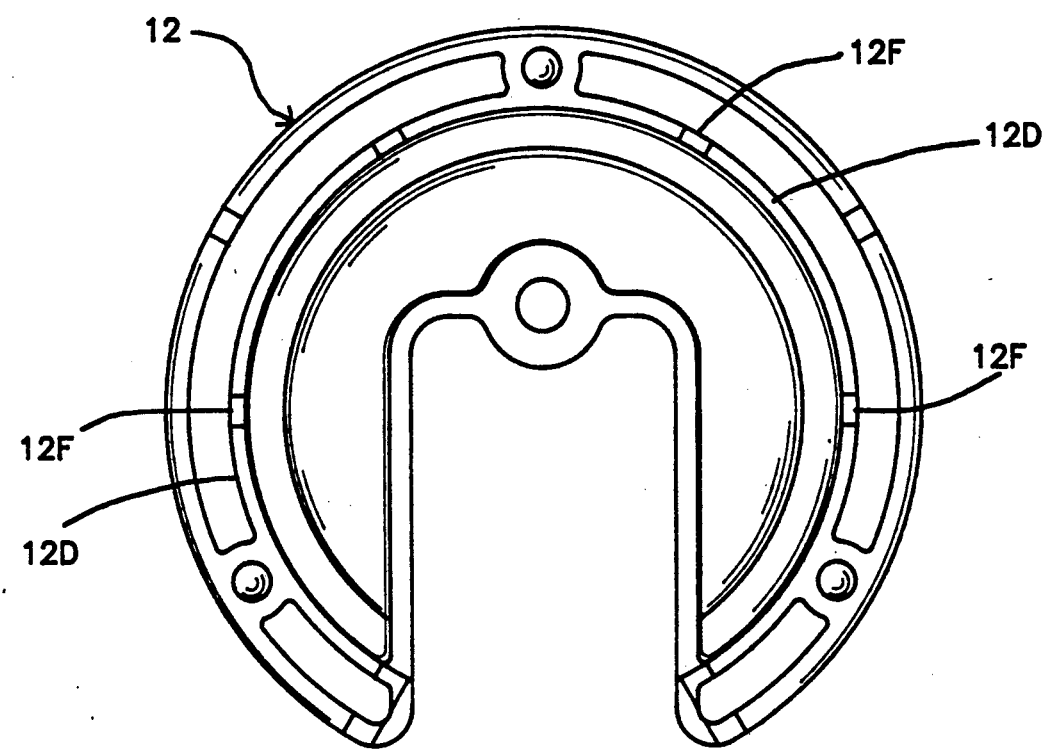
FIG. 3A is a bottom view of the stand shown in FIG. 1.

The preferred embodiment of base member 12 includes a central portion 12B which is higher than the outward portion 12C. Step members 12E are spaced around the periphery of the base 12, as illustrated, to facilitate nesting of the stacked base members. As shown in FIGS. 3 and 3A, the underside of each base member includes a downwardly projecting rim member 12D which is adapted to rest upon the step members 12E of the base member below it.

As illustrated in FIG. 3A, the underside of the base member 12 includes downwardly projecting rim member 12D. At spaced intervals along rim 12D there are detents or recessed areas 12F. The spacing between adjacent detents 12F corresponds to the spacing between adjacent step members 12E so that when one support stand is stacked upon another of like design, the detents 12F on the underside of the upper base will engage the step members 12E on the upper side of the lower base. The depth of the detents or recessed areas 12F may vary. The width of each area 12F is generally only slightly greater than the width of a step member 12E. The presence of the detents or recessed areas assists in aligning the several stands in proper position for maximum stacking quantity (e.g., six stands of the design shown in FIG. 1). The stand of FIG. 1 includes six steps 12E and six detents or recessed areas 12F. Six stands of this type could still be stacked upon each other with only one step member and one detent, if desired. Of course, the detents are not required to be present at all, although it is preferred to include them.

Figure 4:
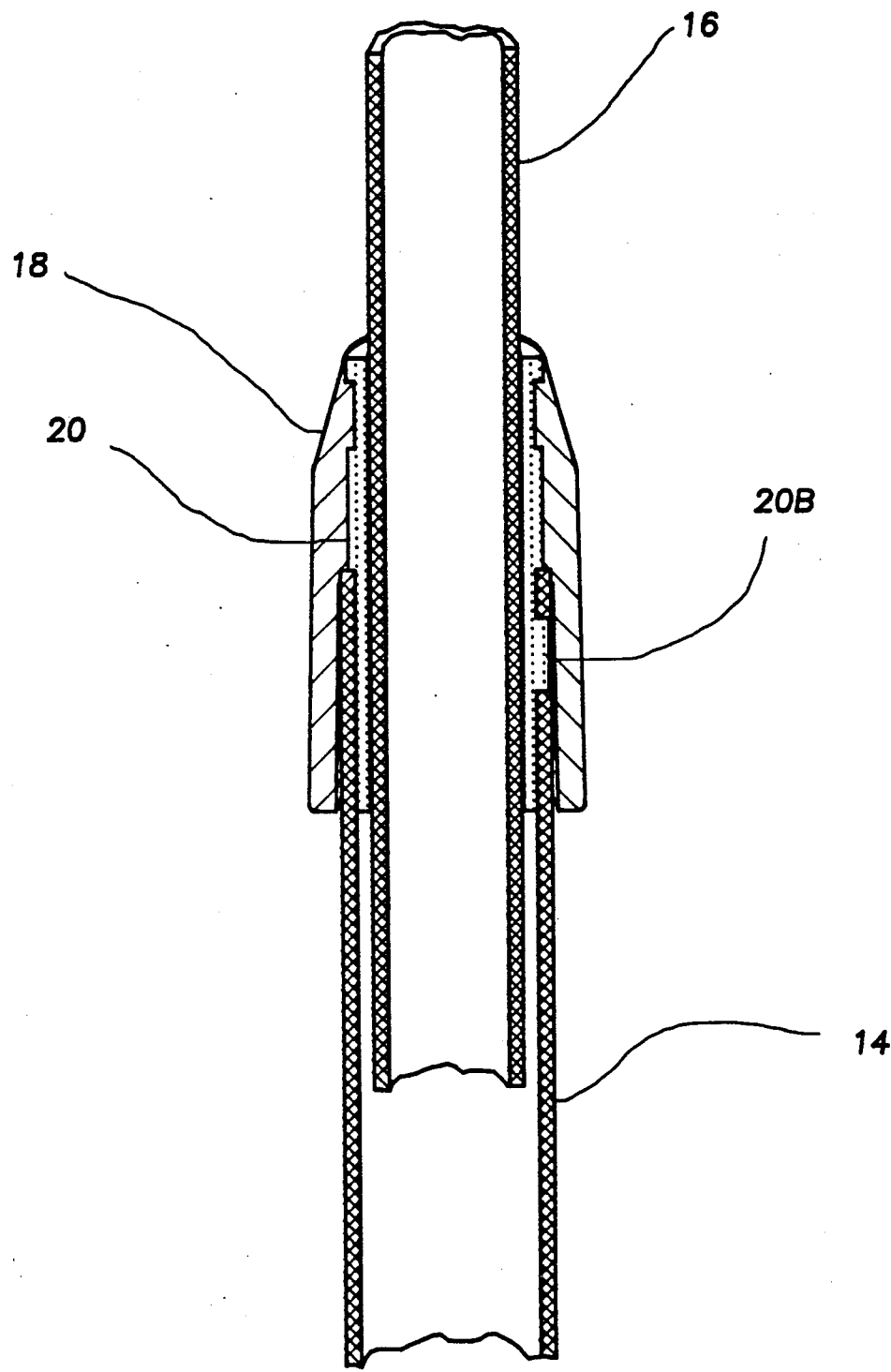
FIG. 4 is a cross-sectional view illustrating one embodiment of the support stand of the invention which includes a telescoping upright member.
Figure 5:
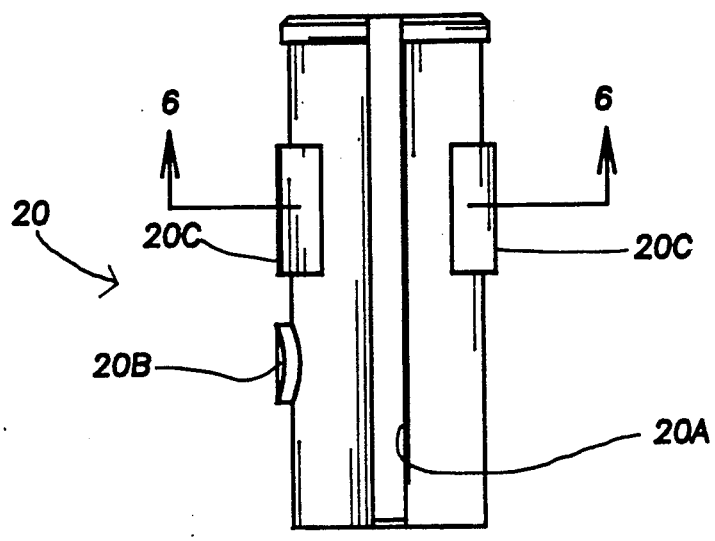
FIG. 5 is a side elevational view of one type of clutch member which is useful in the present invention.
Figure 6:
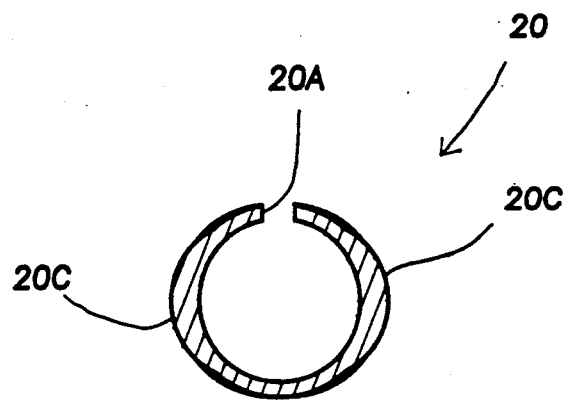
FIG. 6 is a cross-sectional view of the clutch member show in FIG. 5.
Figure 7:
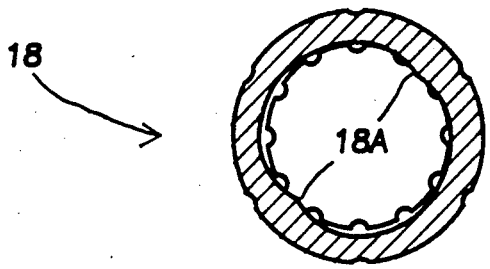
FIG. 7 is a cross-sectional view illustrating a preferred type of rotatable collar member.

The riser member 16 is slidably received in the upper end of the tubular upright member 14. As shown in FIG. 4, a tubular clutch member or receiver 20 is carried by the upper end of the upright 14. The clutch member or receiver is also shown in FIGS. 5 and 6.

The clutch member 20 preferably includes a longitudinal slot 20A, and also includes at least one, and preferably two, outwardly projecting ridge members 20C on opposite sides thereof. To hold the clutch member in place, it includes an outwardly projecting tab member 20B which extends into an appropriate aperture in the wall of the tubular member 14. The clutch member 20 can be squeezed slightly so as to reduce the diameter thereof so that it can be slidingly received in the open upper end of the tubular member 14. Then when the tab member 20B is in alignment with the aperture in the wall of tubular member 14, the clutch member 20 can be allowed to spring back toward its original shape and the tab 20B extends into the aperture. Then the riser member 16 can be inserted through the clutch member or receiver 20, as illustrated in FIG. 4. Because of the close fit between the riser 16 and the clutch or receiver 20, the receiver 20 is prevented from becoming disengaged from the upper end of the tubular member 14. No separate fasteners are required to hold the receiver 20 to the upright member 14 in the preferred embodiment illustrated.

Acting in cooperation with the clutch member or receiver 20 is the collar 18 which is also carried by the upper end of the upright 14. Collar 18 includes at least one (and preferably two) cam members 18A which are adapted to engage the outwardly projecting ridge members 20C on the clutch member 20. When the cam members engage the ridge members (by simple rotation of collar 18) the clutch member is squeezed and thereby made smaller in diameter. The reduction in diameter of the clutch member causes it to grip the riser member 16 and lock it in place relative to the upright member 14. Rotation of the collar 18 in the opposite direction enables the clutch 20 to return to its original condition out of engagement with the riser 16.

Figure 8:
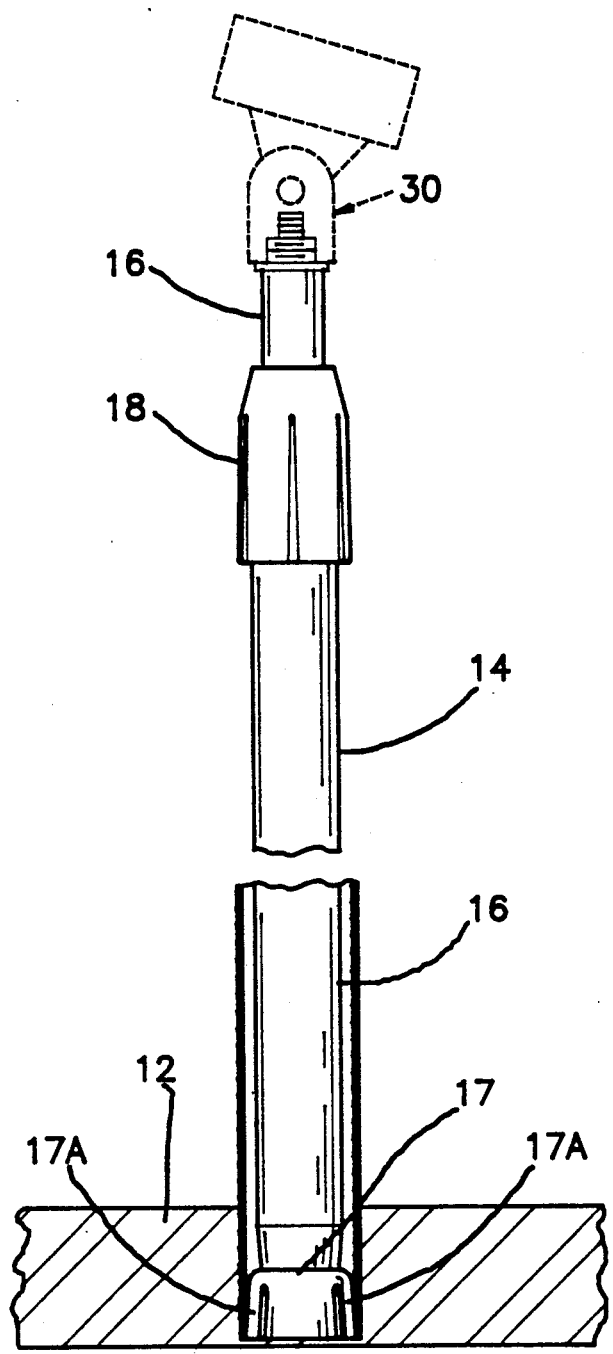
FIG. 8 is a side elevational view, partially cut-away, of a preferred embodiment of microphone stand of the invention.

FIG. 8 illustrates a preferred embodiment of microphone stand of the invention in which a microphone clip 30 is secured to the upper end of riser member 16. At the lower end of riser 16 there is carried a glide member 17 which is composed of plastic (e.g., high density polyethylene) and which includes wing members 17A which extend outwardly and engage the inner wall of upright 14. The presence of glide member 17 serves to center the riser 16 within tubular member 14 and also serves to limit the extent to which riser 16 may extend downwardly into upright 14. Thus, the upper end of riser 16 is prevented from contacting the upper end of collar 18. This eliminates a pinch point. Another manner of limiting the extent of downward travel of the riser member is to reduce the diameter of the tubular member 14 at a desired location where the lower end of the riser member will then be prevented from traveling past.

The lower end of the upright member 14 may be secured to the base member in a variety of manners. A preferred manner is to provide a tapered opening in the base member to receive a tapered lower end of the upright member. A threaded bolt or screw may then extend through the base and into the lower end of the riser to secure the upright to the base.

The shape of the base member may vary considerably. Other useful shapes are illustrated in FIGS. 9 through 18. Thus, FIG. 9 shows a triangular shape with a generally square-shaped slot or opening extending from one side edge toward the upright member 40. In each of FIGS. 9-18 the upright member has been designated as 40. It is perpendicular to the base in all instances shown in the drawings, although it is not required that the upright member be perpendicular to the base.

Each of the base members illustrated in FIGS. 9 to 17 includes an outside edge and a geometric center, and the upright member is secured to the base at a point between the outside edge and the geometric center. In each of the embodiments shown in FIGS. 9-15 there is a single slot or opening extending from the outside edge of the base toward the upright member. The slot or opening may have a variety of shapes, as illustrated.

The embodiments shown in FIGS. 16 and 17 include a plurality of spaced slots or openings extending from the outside edge toward the center of the base. The upright member is secured to the base near the outside edge thereof.

The embodiment shown in FIG. 18 is disc-shaped but does not include a slot extending inwardly. Rather, this embodiment provides for the upright member to be secured to a tab 42 extending outwardly from one side edge of the base.

All of the embodiments shown in FIGS. 9-18 enable like stands to be stacked upon each other without disassembly. Engagement means may be provided on each base member to facilitate detachable connection of one base to another in stacked arrangement if desired.

Other variants are possible without departing from the scope of this invention. For example, the size of the base member and the upright member may vary, as desired. The use to which the stand is put may also vary.

What is claimed is:

1. A support stand of the type including a base member and an upright member supported by said base member; wherein said base member includes a geometric center and a first outside edge; wherein said upright member is secured to said base member at a point between said first outside edge and said geometric center; and wherein said base member further includes at least one slot extending from an outside edge opposite said first outside edge of said base member toward said geometric center; wherein said upright member is perpendicular to said base member; and wherein said support stand is vertically nestable and stackable with another support stand of the same shape in a manner such that said upright member of a first said support stand extends through a said slot in the base member of each said support stand stacked above said first support stand, and wherein said upright member of said support stands are parallel to each other.

2. A support stand in accordance with claim 1, wherein said base member is disc-shaped; and wherein said slot extends from the edge of said base to said upright member.

3. A microphone stand of the type including a base member and an upright member supported by said base member; wherein said base member includes a geometric center and a first outside edge; wherein said upright member is secured to said base member at a point between said first outside edge and said geometric center; and wherein said base member further includes at least one slot extending from an outside edge opposite said first outside edge of said base member toward said geometric center; wherein said upright member is perpendicular to said base member; and wherein said microphone stand is vertically nestable and stackable with another microphone stand of the same shape in a manner such that said upright member of a first said microphone stand extends through a said slot in the base member of each said microphone stand stacked above said first microphone stand, and wherein said upright members of said microphone stands are parallel to each other.

4. A microphone stand in accordance with claim 3, wherein said base member is disc-shaped; and wherein said slot extends from the edge of said base to said upright member.

5. A microphone stand in accordance with claim 4, wherein said base member includes a central portion and an outward portion, wherein said central portion projects upwardly above said outward portion.

6. A microphone stand in accordance with claim 5, wherein said outward portion includes an upper face and a lower face; wherein said upper face includes a plurality of step members in a common plane; and wherein said lower face includes a rib member located below and in alignment with said step members.

7. A microphone stand in accordance with claim 3, wherein said upright member is tubular and includes an upper end; wherein said upper end includes an outwardly projecting ridge member; further comprising (a) an elongated riser member slidably received in said upper end of said upright member; and (b) a collar member carried by said upper end of said upright member and being adapted to be rotated to squeeze said upper end to reduce the diameter of said upper end.

8. A microphone stand in accordance with claim 7, further comprising glide means carried by said riser member and being adapted to limit downward movement of said riser member in said upright member.

9. A microphone stand in accordance with claim 7, wherein said upper end of said upright member includes two said ridge members; and wherein said collar member is adapted to engage said ridge members to thereby squeeze said upper end to reduce the diameter thereof.

10. A microphone stand in accordance with claim 9, wherein said collar member includes internal cam members which are adapted to engage said ridge members on said upper end and thereby squeeze said upper end in response to rotation of said collar member.

11. An adjustable microphone stand comprising:
(a) a base member which includes a geometric center and a first outside edge; and wherein said base member further includes at least one slot extending inwardly from an outside edge opposite said first outside edge toward said geometric center;
(b) a tubular upright member having upper and lower ends; wherein said lower end is secured to said base member at a point between said first outside edge and said geometric center; wherein said upright member is perpendicular to said base member;
(c) a riser member which is slidably received in said upper end of said upright member; and
(d) clutch means comprising (i) a tubular receiver carried by said upper end of said upright member; wherein said receiver includes an outwardly projecting ridge member; and (ii) a rotatable collar member carried by and surrounding said tubular receiver; wherein said collar member is rotatable with respect to said receiver; and wherein said collar member is adapted to engage said ridge member and thereby squeeze said upper end of said receiver to reduce the diameter thereof and thereby lock said riser member relative to said upright member;

wherein said microphone stand is vertically nestable and stackable with another microphone stand of the same shape in a manner such that said upright member of a first said microphone stand extends through a said slot in the base member of each said microphone stand stacked above said first microphone stand, and wherein said upright members of said microphone stands are parallel to each other.

12. A microphone stand in accordance with claim 11, wherein said receiver includes at least two ridge members; and wherein said collar member includes at least one internal cam member adapted to engage said ridge members to thereby squeeze said upper end to reduce the diameter thereof and lock said riser member against longitudinal movement of said riser member relative to said upright member.

13. A microphone stand in accordance with claim 11, wherein said collar member is rotatable between locked and unlocked positions, wherein said riser member is slidably locked when said collar member is in said locked position.

14. A microphone stand in accordance with claim 11, wherein said base member is polygonal.

15. A microphone stand in accordance with claim 11, wherein said base member is disc-shaped, and wherein said slot extends inwardly a distance at least equal to the radius of said base member.

16. A microphone stand in accordance with claim 15, wherein said base member includes a central portion and an outward portion; wherein said central portion is higher than said outward portion.

17. A microphone stand in accordance with claim 16, wherein said outward portion includes an upper face and a lower face; wherein said upper face includes a plurality of step members in a common plane; and wherein said lower face includes a rib member located below and in alignment with said step members.

* * * * *